A. ANDERSON.
SHEARS.
APPLICATION FILED MAY 1, 1918.
1,299,100.
Patented Apr. 1, 1919.
2 SHEETS—SHEET 1.
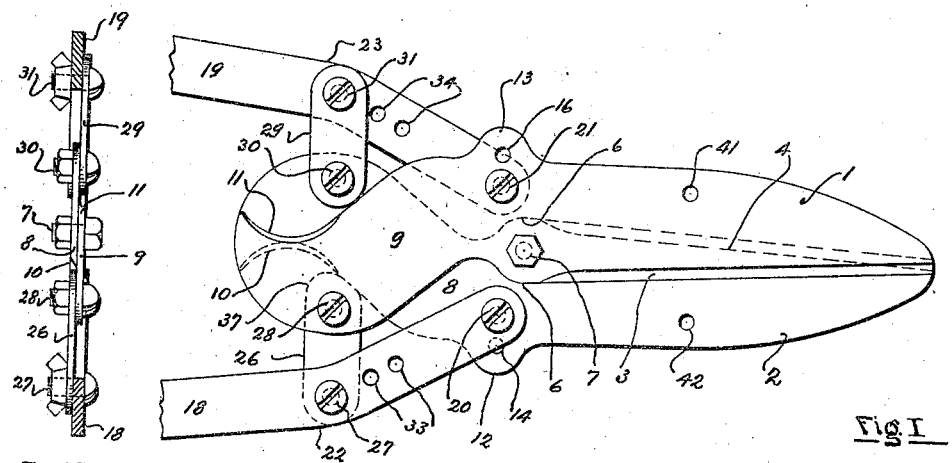
Fig. I
Fig. II
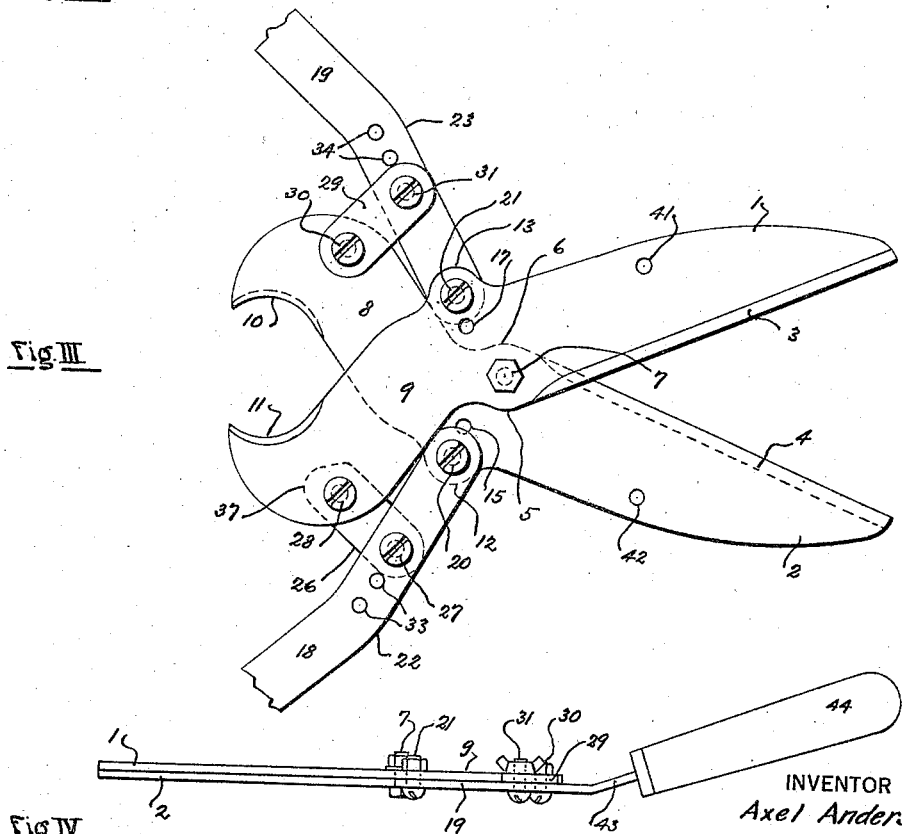
Fig. III
Fig. IV
INVENTOR
Axel Anderson
BY
H C Karlson
ATTORNEY

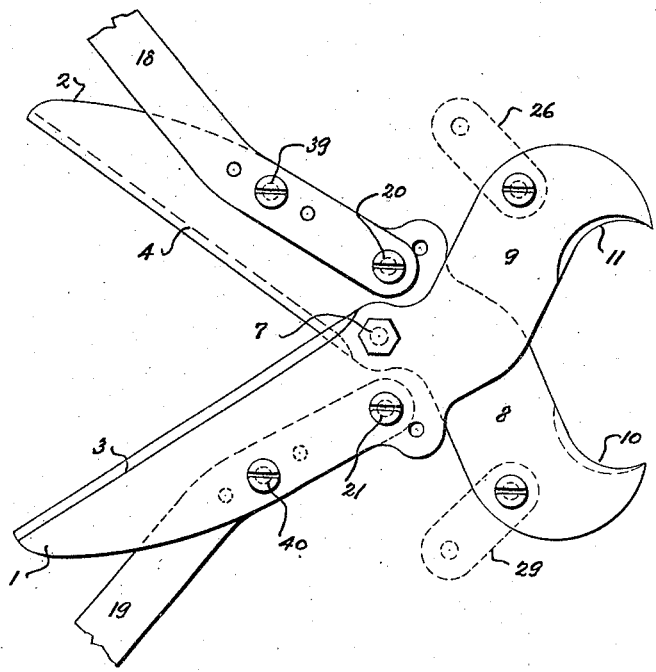

UNITED STATES PATENT OFFICE.

AXEL ANDERSON, OF CLIFTON, NEW JERSEY.

SHEARS.

1,299,100.

Specification of Letters Patent.

Patented Apr. 1, 1919.

Application filed May 1, 1918. Serial No. 231,826.

*To all whom it may concern:*

Be it known that I, AXEL ANDERSON, a citizen of Sweden, and a resident of the city of Clifton, in the county of Passaic and State of New Jersey, have invented certain new and useful Improvements in Shears, of which the following is a specification.

This invention relates generally to keen-edged implements wherein two or more blades are operated in opposed relation to one another for the purpose of cutting or severing various things in plural sections. More particularly, it appertains to cutting instruments that are used in gardens, vineyards and orchards, for trimming or pruning hedges, vines, bushes, fruit-trees, and shrubbery.

One of the objects of the invention is to produce an implement of the character described having pivoted blades the opposed edges whereof are sharpened at both ends, that is, on opposite sides of their pivot, thereby virtually making two shears out of a single instrument including but one pair of cutting members.

Another object is the production of an implement of the type aforesaid including paired members formed with opposed cutting edges at both ends and fulcrumed together so as to divide them into shear sections of unequal lengths having a greater or lesser leverage according to the purpose for which each of these sections is especially adapted.

A further object is to provide an implement of the nature set forth consisting of crossed blades having opposed cutting edges at both ends, and operating levers so connected with the said blades as to enable either end thereof to be used, at option, without re-arrangement of the said levers.

Still another object is the provision of an implement of the class mentioned composed of a plurality of blades sharpened at both ends and crossing each other so that both ends thereof may be utilized as distinct pairs of shears, combined with reversible handles adapted for operative connection with either end of the crossed blades.

A still further object is to fit the said blades and the operating levers therefor with intermediate connections capable of various adjustments that will afford each a different purchase, depending upon the width of opening desired between the blades and the extent to which the levers may be spread apart in the manipulation thereof at either end of the shears.

Other objects and advantages of the invention will become apparent as the specification proceeds.

Briefly described, the improved implement forming the subject-matter hereof includes a pair of blades that are formed with opposed cutting edges at both ends and are intermediately pivoted together, thereby producing what may properly be termed "double-ended" shears. A single pair of handles or levers is sufficient to operate these shears, either end of which may be worked with the handles or levers set in the one and same direction. For convenience in manipulation, however, the handles or levers are made reversible, to admit of being attached to the blades so that each end thereof may be operated alternately in the usual manner. The connection between the blades and the handles may be either direct or effected through links, which latter are arranged so as to permit adjustment at varying angles, and consequently afford the opportunity of increasing or decreasing the leverage to suit different requirements. The implement is susceptible of modification, by adding thereto a second pair of blades, which double its cutting capacity at one end, while retaining an equal leverage on each pair of blades. By removing the additional blades, the other parts of the implement can be re-arranged to constitute again the original structure, or at least a similar construction.

Referring to the drawings hereto annexed, for a detailed description of the invention,—

Figure I is a side view of a pair of closed shears embodying the principal features above outlined, part of the operating levers or handles being broken away to permit illustration of the cutting members of the implement on a larger scale than would be possible otherwise;

Fig. II is an end view of the construction shown in the preceding figure, looking from the left;

Fig. III is a view similar to Fig. I, but showing the shears open, and some parts thereof changed in their relative positions;

Fig. IV is an edge view of the complete shears, in the form of the invention exemplified in the three first-named views, the shears being shown on a reduced scale; and Fig. V is a side view similar to Fig. III, with the operating levers or handles reversed, the latter being broken away and the cutting members swung apart.

The improved implement, in the form represented by Figs. I to V, inclusive, comprises two similar blades, respectively designated by the reference numerals 1 and 2. These blades have no shanks, such as are found in common scissors or shears, but on the contrary are provided with cutting edges at both ends of each, as will presently be described.

Preferably, and as shown, the said blades are formed at one end with opposed edges 3 and 4, extending longitudinally thereof and arranged to pass each other in the act of cutting. The edges 3 and 4, it will be seen, are beveled both to the same extent, so that the two blades may be exact duplicates one of the other and readily fitted together by simple apposition. This end of the implement furnishes a suitable cutter for trimming hedges, lopping off the finer branches thereof, and removing any superabundance of foliage.

Intermediately of the implement, at the inner extremities of their opposed beveled edges aforesaid, the blades 1 and 2 are respectively formed with swelled-out or hub-like portions 5 and 6, adapted for superimposition one upon the other and suitably perforated to receive a bolt or screw 7. The latter constitutes a pivot or fulcrum about which the blades are conjointly operated.

At their other end, the said blades are more or less abruptly curved outward and crossed, as at 8 and 9, near their said pivot 7. They are also curved inwardly at this end, to form opposed concave edges 10 and 11, which pass each other as the blades are swung on the pivot, and together constitute a tong-shaped cutter well adapted for pruning or shearing off the stouter limbs of shrubs and heavier vegetable growths.

Ears 12 and 13 are provided on the backs or outer edges of both the said blades near their pivot 7, on the side thereof which adjoins the crossed portions 8 and 9. These ears not only impart a distinctive appearance to the blades, but add sufficiently to the width of each to permit the inclusion therein of a plurality of perforations at varying distances from the pivot. Thus, there may be a couple of perforations as 14 and 15, in the ear 12 and the rear half of the blade to which it appertains. Similarly, the ear 13 and the rear half of the blade to which it belongs may have a like number of perforations 16 and 17. These several perforations provide appropriate points of attachment for the operating levers or handles before mentioned.

The blades above-described are conveniently operated from either end by means of a single pair of handles or levers 18 and 19. As represented in Figs. I, III and V, the said handles or levers may be attached, one to each blade, by means of screw-bolts 20 and 21, passing through their inner ends and engaging either the inner perforations 15 and 17 or the outer perforations 14 and 16, previously described. At some distance from their said inner ends, the two handles or levers are reversely bent, for instance as at 22 and 23, to maintain them suitably spaced with relation to the crossed portions 8 and 9 of the blades, when turned in the direction represented in Figs. I and III, or otherwise to enable them, if they are directed as in Fig. V, to lap over the sides of the blades opposite to the longer cutting edges 3 and 4, and diverge therefrom outwardly as they recede from that end of the blades.

Assuming that the said cutting edges 3 and 4 are to be used, the handles or levers 18 and 19 are best applied to the blades in the manner indicated in Figs. I to IV, wherein the former are shown as pivotally connected with the latter at two points on each side.

One connection is effected by the screw-bolt, 20 or 21, passed through either of the perforations that are provided therefor in the respective blade, and which have been previously referred to as selective points of attachment for the inner end of the corresponding handle or lever. Another connection consists in attaching each handle or lever to the opposite rear edge of the adjacent blade portion, 8 or 9, respectively. For instance, the handle or lever 18 may be connected to the blade portion 9, by means of a link 26, and screw-bolts 27 and 29, respectively passing through the opposite ends of the latter and overlying parts of the blade and handle or lever. On the other side, the handle or lever 19 may be attached to the blade portion 8, by a link 29, and screw-bolts 30 and 31, passed through the opposite ends thereof and underlying parts of the blade and handle or lever, respectively. When thus applied, the handles or levers are linked, each on its own side of the shears, to both the blades 1 and 2, and therefore are adapted to open and close the same alternately, by oscillating them about the pivot or fulcrum 7. It is understood, of course, that the links 26 and 29 are fitted so as to swing freely on their respective screw-bolts.

Several holes, as 33 and 34, are bored through each of the handles or levers 18 and 19, to receive respectively the screw-bolts 27 and 31 of the links 26 and 29. This provides for an equal adjustment of each link, which determines the angle at which both links should be set and arranged to work relatively to the blades 1 and 2, including their crossed portions 8 and 9. Two different adjustments are represented in Figs. I and III.

The more acute the angle, it is to be noted, the less will be the opening intermediate the blades, and likewise between the handles or levers, with a greater purchase, and vice versa.

In Fig. I, the links 26, 29 are shown as coupling the screw-bolts 28, 30 to the rear extensions 9, 8 of the shearing elements 1, 2, with the screw-bolts 27, 31 entered in the holes 33, 34 farthest away from the attachment screw-bolts 20, 21 of the handle levers 18, 19. The result attained by this arrangement is that the shearing blades 1, 2 open to a greater extent than if the screw-bolts 27, 31 were in engagement with the inner ones of the set of holes 33, 34. But, in this latter case, more of a purchase would be had by the handles or levers on the shearing elements with the same movement of the former. Placing the attachment screw-bolts 20, 21 in the outer set of holes 14, 16 in the shearing elements 2, 1, produces the effect that the outer ends of the levers 18, 19 are brought closer together during the inward or closing movement of the shear blades.

The arrangement of the various pivotal connections is affected by the manipulation of the handle levers 18 and 19. These connections form a pair of irregular pentagons having two sides in common. Thus, the central distances between 7—21, 21—31, 31—30, 30—20 and 20—7 constitute the irregular sides of one pentagon, which is affected by the movement of the handle lever 19, while the distances intermediate of 7—20, 20—27, 27—28, 28—21 and 21—7 are the sides of the other irregular pentagon, affected by the handle lever 18, the sides 21—7 and 7—20 being common to both of these pentagons. In their full open position the pivots 31—21—7 on one side, and 7—20—27 on the other side lie in substantial alinement, as seen in Fig. III.

The said links may further be utilized, either on both of them, as stops to check the inward movement of the blades relatively to each other and prevent the overlapping thereof beyond a desirable limit. This is effectively accomplished, for example, by shaping one end or one side of the link 26, as at 37, Fig. I, and placing the same so that it will come into contact with the inward curve of the adjoining blade portion 8, when closing the shears. Other abutments may similarly be produced on contacting parts of the blades, links, and handles or levers.

When there is occasion to use the cutting edges 10 and 11 for an appreciable length of time, it is preferable to reverse the handles or levers 18 and 19, as represented in Fig. V. In the latter case, the handles or levers again are attached each at two different points, but the connections are with the longer ends of the blades only, and designed to be relatively fixed, to such extent that neither the blades nor the handles or levers can have an independent movement. These connections, in the example given, are effected by swinging the handles or levers back upon their pivots 20 and 21, and laying their inner bent extremities flat over the opposed inner faces of the said longer ends of the blades. In this position, the bent portions of the handles or blades are rigidly secured to the blades 1 and 2, by screw-bolts 39 and 40, passing through holes 41 and 42 therein.

It will be observed, by referring once more to Figs. I and III, that while the blades and handles or levers are respectively positioned to perform the cutting with the greatest advantage through the use of the forwardly extending edges 3 and 4, yet some very effective work can be done also by using the rearwardly arranged edges 10 and 11. The purchase on the latter by the handles or levers will be equally powerful, though they may not at times occupy the most convenient position. It will further be noted, with reference to Fig. V, that the edges 10 and 11, there positioned foremost, are quite conveniently disposed for carrying on their part of the cutting, but nevertheless with this other arrangement the edges 3 and 4 can also do their share, even though they have been relegated to the rearmost position.

As shown in Fig. IV, the handle levers 18 and 19, are offset upwardly, as at 43, to clear the hedge or other growths operated upon, and besides to incline them at convenient angles to be taken hold of for manipulation. These levers may further be provided at their outer extremities with grips or handle-grasped portions, as indicated by the numeral 44, in the same figure.

While a certain preferred embodiment of this device has been shown and described, it will be understood that changes in the form, arrangements, sizes, proportions and details thereof may be made, without departing from the scope of the invention as defined by the appended claims.

Having described my invention what I desire to secure by Letters Patent and claim is:—

1. An implement of the nature set forth including a plurality of members provided with cutting edges on opposite sides thereof, said members being fulcrumed intermediately of their said edges, and operating means separately pivoted to the members and capable while so connected of being coupled with the members on either side of said fulcrum.

2. An implement of the nature set forth composed of a plurality of members connected so as to oscillate relatively to one another and provided with cutting edges of unequal lengths on opposite sides of their point of oscillation, combined with operating levers flexibly secured to said members one at each side of said pivot and attachable to either end of the members at option.

3. An implement of the nature set forth including a plurality of members provided with coacting edges arranged on opposite sides of a common pivot, operating levers capable of being alternately attached to either end of said members, and means permanently coupling said levers to the members.

4. An implement of the nature set forth including a plurality of members provided at both ends with opposed cutting edges designed for coaction with one another, and reversible levers pivotally attached to said members so as to be capable of operating the same from either one of their said ends.

5. An implement of the nature set forth including a plurality of members constituting oppositely-disposed shears intermediately fulcrumed together, actuating levers therefor, connections enabling said levers to operate the shears on said members from either end, and pivots affording permanent means of attachment for the levers adjacent to the fulcrum of the shears.

6. An implement of the nature set forth including paired members having opposed cutting edges at each end, an intermediate pivot connecting said members together, actuating levers pivoted independently of one another to the members, and movable links adjustably connecting said levers with the adjoining members whereby variable degress of purchase are obtained for each set of said cutting edges.

7. An implement of the nature set forth including a plurality of members of different lengths crossed and offset to provide opposed cutting edges coincidently operable at both ends, an intermediate pivot affording a fulcrum for said members, operating levers flexibly connected each to one of the members laterally thereof, and links providing similarly flexible connections each between the offset portion of either member and one of said levers.

8. An implement of the nature set forth including a plurality of members pivotally connected together and having opposed cutting edges of unequal length paired respectively on opposite sides of their point of junction, combined with operating levers having each a flexible connection with one member near the longer edge thereof, and links jointed to said levers having each a similarly flexible connection with another member near its shorter edge.

9. An implement of the nature set forth including paired members of different lengths with opposed cutting edges at both ends, a pivot intermediately joining said members together, operating levers flexibly connected each to one of the members, and links also having similar connections each with one member and one of said levers, the inner end of either link forming an abutment against the adjoining shorter member to limit the inward oscillation of the members, and the flexibly connected end of the corresponding lever acting to stop the outward oscillation as the members are opened.

10. An implement of the nature set forth including a pair of oscillatable members having opposed cutting edges of unequal lengths at opposite ends thereof, a pivot intermediately connecting said members together, reversible levers flexibly joined to said members at each side of said pivot, links adapted normally to couple said levers with the ends of the members having the shorter cutting edges, and means for rigidly connecting the levers with the ends of the members having the longer cutting edges while said links are uncoupled, thereby enabling the shorter edges to be used foremost with the longer edges arranged to cut in a rearward direction.

11. An implement of the nature set forth including a pair of members of different lengths having opposed sets of cutting edges at their ends, a pivot joining said members intermediately of said sets of edges, operating levers having their inner extremities adapted for connection with the members by the opposite sides of said pivot, the members being each provided with plural points of attachment for the corresponding extremities of said levers, and links coupling the shorter ends of said members to the levers at a distance from their said extremities.

12. An implement of the nature set forth including a pair of members of different lengths placed side by side and providing opposed sets of cutting edges at their ends, the shorter ends of said members being offset with relation to the longer ends thereof, a main pivot joining the members to each other intermediately of said sets of cutting edges, actuating levers having their inner extremities pivotally attached to the members laterally of said main pivot, each lever lying adjacent to the thereto attached member in the plane of the opposite member, and links connecting the levers with said offset ends of the members, each link operating in the same plane as the member to which its lever is attached.

AXEL ANDERSON.

Copies of this patent may be obtained for five cents each, by addressing the "Commissioner of Patents, Washington, D. C."